2,960,488
Patented Nov. 15, 1960

2,960,488

POLY-α-OLEFINS CONTAINING SUBSTITUTED UREAS

John W. Tamblyn and Wayne V. McConnell, Kingsport, Tenn., assignors to Eastman Kodak Company, Rochester, N.Y., a corporation of New Jersey No Drawing. Filed Apr. 25, 1958, Ser. No. 730,775

8 Claims. (Cl. 260—45.9)

This invention relates to the stabilization of poly-α-olefin compositions. A preferred embodiment of the invention relates to the stabilization of polyethylene compositions against deterioration resulting from exposure to sunlight or ultraviolet light.

Poly-α-olefins, such as polyethylene and the like, are subject to photo-oxidation when exposed to sunlight or ultraviolet light. This oxidation in poly-α-olefins is characterized in its earlier stages by the breaking of the polymer chain and the formation of carbonyl groups in the molecule with a resultant deleterious effect on the electrical properties of the polymer. As the oxidation continues, poly-α-olefins crack and lose tensile strength to the point of mechanical failure.

A number of so-called ultraviolet inhibitors are known to inhibit the photo-degradation of many polymers, resins and polyesters. However, some of the more effective of these known ultraviolet inhibitors are not compatible with such poly-α-olefins as polyethylene in that they either exude therefrom soon after being incorporated therein or are insoluble therewith. Also, there are other known ultraviolet inhibitors that are compatible with such poly-α-olefins as polyethylene but are not entirely satisfactory stabilizers therefor. In addition, many effective stabilizers for chlorine-containing polymers such as polyvinyl chloride, chlorinated polyethylene, polyvinylidene chloride, poly(2,3-dichloro-1,3-butadiene) and the like are not necessarily effective stabilizers for poly-α-olefins as stabilizers in chlorine-containing polymers function essentially as hydrogen chloride scavengers while stabilizers in polyethylene do not serve this function. Similarly, there are certain stabilizers that are eminently suitable as ultraviolet inhibitors in such cellulosic ester plastics are cellulose triacetate, cellulose acetate butyrate and the like that are not particularly effective in poly-α-olefins. Hence, it is highly unpredictable as to whether a given compound will be both compatible with, and a good stabilizer for, poly-α-olefin compositions short of actually testing the compound in poly-α-olefins.

It is an object of this invention to provide new poly-α-olefin compositions of high stability.

It is a further object of this invention to provide novel polyethylene compositions containing additives that are compatible with, and effective stabilizers for, the polyethylene compositions.

It is likewise an object of this invention to provide new polyethylene compositions having improved stability against deterioration resulting from exposure to sunlight or ultraviolet light.

It is also an object of this invention to provide new polyethylene compositions of improved stability in thin film form.

Other objects of this invention will be apparent from the description and claims which follow.

The present invention comprises poly-α-olefin compositions having incorporated therein a stabilizing amount of one of the following substituted ureas:

(a) 1-(p-hydroxyphenyl)-3-phenylurea

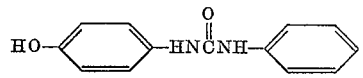

(b) 1-(p-hydroxyphenyl)-1-alkyl-3-phenylurea

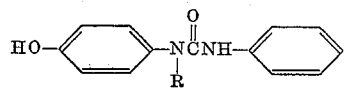

(c) 1,3-di-(p-alkoxyphenyl)urea

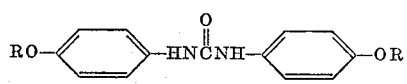

(d) 1,3-di-(p-hydroxyphenyl)thiourea

(e) 1,1' - (4 - alkyl - 1,3 - phenylene) - bis[3-(p-hydroxyphenyl) - 3 - alkylurea]

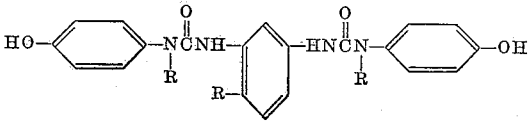

wherein the alkyl groups, the substituents "R," contain 1 to 6 carbon atoms and preferably are methyl groups.

The substituted urea stabilizers of the invention can be readily prepared by known procedures. The stabilizers 1 - (p - hydroxyphenyl) - 3 - phenylurea, 1 - (p - hydroxyphenyl) - 1 - methyl - 3 - phenylurea, and 1,1' - (4-methyl - 1,3 - phenylene)-bis[3 - (p - hydroxyphenyl) - 3-methylurea] can be prepared by adding an appropriate isocyanate dropwise to a stirred suspension of an appropriate aminophenol in benzene at a temperature of 40–70° C. The mixture is stirred for one hour after the isocyanate addition and then cooled and filtered. In accordance with this process, 1-(p-hydroxyphenyl)-3-phenylurea is prepared by reacting one mole of phenyl isocyanate with one mole of p-aminophenyl; 1-(p-hydroxyphenyl)-1-methyl-3-phenyl urea is prepared by reacting one mole of phenyl isocyanate with one mole of p-methylaminophenol and 1,1'-(4-methyl-1,3-phenylene)-bis[3-(p-hydroxyphenyl)-3-methyl urea] is prepared by reacting two moles of p-methylaminophenol with one mole of 2,4-toluene diisocyanate. The symmetrical stabilizers 1,3-di-(p-methoxyphenyl)urea and 1,3-di-(p-hydroxyphenyl)-thiourea can be prepared by reacting one mole of urea with two moles of p-methoxyaniline, and one mole of thiourea with two moles of p-hydroxyaniline, respectively, by the procedure described in J. Indian Chem. Soc. 7,793–7 (1930). By such methods, the yields of the subject substituted urea stabilizers are high and in most instances substantially quantitative. The reaction products are of sufficient purity for direct use as stabilizers. When desired, however, further purification can be attained by the use of usual recrystallization techniques.

The substituted ureas described herein can be used to stabilize a wide variety of poly-α-olefin compositions against deterioration resulting from exposure to ultraviolet light. Any of the normally solid poly-α-olefins prepared from α-monoolefinic aliphatic hydrocarbons containing from 2 to 10 carbon atoms can be stabilized with the subject substituted ureas. The subject stabilizers are preferably used in polyethylene although such poly-α-olefins such as polypropylene, poly-4-methylpentene-1, poly-3-methylbutene-1 and the like are included in the present invention. Both the so-called "low density" and "high density" poly-α-olefin compositions can be stabilized in accordance with the invention. With regard to polyethylene, for example, "low density" polyethylene usually has a density of about 0.91 to 0.93 and can be prepared by several methods including the method disclosed by Fawcett et al. in U.S. Patent No. 2,153,553. "High density" polyethylene usually has a density of about 0.94 to 0.97 and can be prepared by such methods as are disclosed in copending applications, Coover, U.S. Serial No. 559,536 which was filed January 17, 1956 and Coover, U.S. Serial No. 613,609 which was filed October 3, 1956. While the subject stabilizers are more usually used to stabilize the more common normally solid plastic poly-α-olefin compositions having average molecular weights at least about 15,000 and usually at least 20,000, these stabilizers likewise can be used to stabilize the so-called poly-α-olefin waxes having lower molecular weights.

The amount of the present stabilizer employed in poly-α-olefin compositions can be widely varied, the stabilizing amount used varying with the particular poly-α-olefin composition and the use to which the poly-α-olefin is to be put. Concentrations of stabilizer of at least 0.1% are suitably used, with concentrations of 0.1% to 10% being more generally used, with concentrations of 0.5% to 5% and often times 0.5% to 2.5% being preferably used, the concentrations of stabilizer being based on the weight of the poly-α-olefin.

The stabilizers of the invention can be incorporated or blended into poly-α-olefins by any of the conventional methods used for blending related materials into plastics or resins. Typical of such methods that can be suitably employed include milling on heated rolls, deposition from solvents and dry blending. The subject stabilizers are compatible with poly-α-olefins in the stabilizing amounts employed and thus can be readily incorporated therein.

The substituted urea stabilizers of the invention lend to poly-α-olefins improved stability. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded or molded into sheets, rods, tubes, piping, filaments and other shaped articles. The present compositions can also be used for coating paper, cloth, wire, metal foil, glass fiber fabrics, synthetic and natural textiles and other such materials. As the subject stabilizers do not exude from poly-α-olefins in objectionable amounts as do many stabilizers, the subject stabilizers can be effectively used to stabilize thin films or sheets of the polymer 0.5 to 100 mils in thickness, for example.

The invention is illustrated by the following examples of preferred embodiments thereof.

EXAMPLE 1

Polyethylene samples conatining 1% by weight of one of the following stabilizers of the invention: 1-(p-hydroxyphenyl) - 3 - phenylurea, 1 - (p - hydroxyphenyl) - 1 - methyl - 3 - phenylurea, 1,3 - di - (p - methoxyphenyl)- urea, and 1,1'-(4-methyl-1,3-phenylene)-bis[3-(p-hydroxyphenyl) - 3 - methylurea] were subjected to an outdoor weathering test. Also included for comparative purposes were polyethylene samples containing one of the following additives: 4,4' - diphenyl thiocarbanilide, 1,1' - (1,5-naphthylene)-bis[3-(p-hydroxyphenyl)-3-methyl urea], and thiocarbanilide, as well as a sample containing no stabilizer additive. The various additives were incorporated into polyethylene having an average molecular weight of about 27,600 and a density of 0.919 by milling on heated rollers in accordance with the usual practice. Thereafter, the polyethylene was compression molded into sheets 60 mils in thickness. Samples of the resulting sheets containing the various additives and the control sample containing no additive were exposed to outdoor weathering on a rack facing south at an angle with the horizontal of 36.5° at Kingsport, Tennessee. The carbonyl content of the various samples was determined before exposure and after 69 summer days of exposure by measurement of the infrared absorption in the 5.82 μ region. An arbitrary carbonyl unit was given to the carbonyl increase for comparative purposes. The determination of the carbonyl increase in polyethylene gives an early and reliable indication of the breaking down of this polymer. The carbonyl increase in the samples tested is set out in Table 1 below. Reference is made to the following two references concerning the determination of the carbonyl content by infrared measurements: Rugg, Smith and Bacon, J. Polymer Sci., 13, 535 (1954) and Cross, Richards and Willis, Discussions, Faraday Soc., No. 9, 235 (1950).

Table 1

| Additive: | Carbonyl formation after 69 days exposure |
|---|---|
| None | 17 |
| 4,4'-diphenyl thiocarbanilide | 17 |
| 1,1' - (1,5 - naphthylene) - bis[3 - (p - hydroxyphenyl)-3-methyl urea] | 18 |
| Thiocarbanilide | 22 |
| 1,3-di-(p-methoxyphenyl)urea [1] | 12 |
| 1-(p-hydroxyphenyl)-3-phenyl urea [1] | 11 |
| 1 - (p - hydroxyphenyl) - 1 - methyl - 3 - phenyl urea [1] | 11 |
| 1,1'-(4 - methyl - 1,3 - phenylene) - bis[3 - (p - hydroxyphenyl)-3-methyl urea] [1] | 10 |

[1] Stabilizers of the invention.

EXAMPLE 2

Into polyethylene samples having an average molecular weight of 27,600 and a density of 0.919 was hot-roll-compounded 1% by weight of one of the following stabilizers of the invention: 1,3-di-(p-hydroxyphenyl)thiourea, 1 - (p - hydroxyphenyl) - 1 - methyl - 3 - phenylurea and 1,3-di-(p-methoxyphenyl)urea. The resulting compositions were thereafter compression molded into sheets ⅛ inch thick. Ten samples for each of the additives, 1½ by ½ inches, were diced out of the compression molded sheets, bent into a U shape and exposed to outdoor weathering at Kingsport, Tennessee. The stressed portion of each sample was mounted facing south. Ten additional samples were similarly prepared with no additive and were also subjected to the weathering test for comparative purposes. The exposure times in days required to crack half of the samples (five samples) are recorded below in Table 2.

Table 2

| Additive: | Stress cracking resistance (days) |
|---|---|
| None | 337 |
| 1,3-di-(p-hydroxyphenyl)thiourea | 364 |
| 1-(p-hydroxyphenyl)-1-methyl-1-3-phenyl urea | 364 |
| 1,3-di-(p-methoxyphenyl) urea | 372 |

EXAMPLE 3

Polyethylene samples having an average molecular weight of about 27,600 and a density of 0.919 were prepared in the form of 1 mil thick films, 2½ by ½ inches in size, with 1% by weight of 1-(p-hydroxy)-1-methyl-3-phenylurea incorporated therein. For comparative purposes a sample containing no additive and another sample containing 1% by weight of 2-mercaptobenzimidazole were prepared. These films were exposed to artificial weathering in an Atlas Twin-Arc Weather-Ometer of the type described in Anal. Chem. 25 460 (1953) that was modified by the addition of 10 Westinghouse 20 watt fluorescent sun lamps. The exposed samples were tested for deterioration after 300 hours and after 500 hours of exposure to the artificial weathering by elongation measurements on an Instron Tensile Tester at a rate of stretch of 100% per minute. The samples were conditioned three days at 73° F. at a relative humidity of 50%. The results of the test are summarized in Table 3 below:

Table 3

| Additive | Percent Original Elongation Retained After Exposure of— | |
|---|---|---|
| | 300 Hr. | 500 Hr. |
| None | 32 | 0 |
| 2-Mercaptobenzimidazole | 20 | 0 |
| 1-(p-Hydroxyphenyl)-1-methyl-3-phenylurea | 54 | 26 |

The compound, 2-mercaptobenzimidazole, is included for comparative purposes as this compound was described in U.S. Patent No. 2,727,879 as a light stabilizer for polyethylene that is superior for this purpose over a wide variety of conventional plastic, rubber, and fat stabilizers.

EXAMPLE 4

Into polyethylene samples having an average molecular weight of about 27,600 and a density of 0.919 was hot-roll-compounded 1% by weight of one of the following stabilizers: 1,3-di-(p-hydroxyphenyl)thiourea, 1-(p-hydroxyphenyl)-1-methyl-3-phenylurea and 1,3-di-(p-methoxyphenyl)urea as well as 1,3-di-(p-hydroxyphenyl)urea and 4-phenylthiosemicarbazide for comparative purposes. The resulting compositions were compression molded into films 5 mils thick and cut into 2½ by ½ inch samples. Similar polyethylene samples containing no additive were prepared. The thus prepared samples were exposed to artificial weathering and tested for deterioration by elongation measurements after 300 hours and after 550 hours of exposure as described in Example 3 above. The results of the test are summarized by the data set out in Table 4 below:

Table 4

| Additive | Percent Original Elongation Retained After Exposure of— | |
|---|---|---|
| | 300 Hr. | 550 Hr. |
| None | 20 | 0 |
| 1,3-Di-(p-hydroxyphenyl)urea | 14 | 0 |
| 4-Phenylthiosemicarbazide | 18 | 5 |
| 1,3-Di-(p-hydroxyphenyl)thiourea [1] | 35 | 10 |
| 1-(p-Hydroxyphenyl)-1-methyl-3-phenylurea [1] | 80 | 25 |
| 1,3-Di-(p-methoxyphenyl)urea [1] | 85 | 50 |

[1] Stabilizers of the invention.

EXAMPLE 5

The compound, 1-(p-hydroxyphenyl)-1-methyl-3-phenylurea, was hot-roll-compounded into a sample of polypropylene at a 1% level, compression molded into a film 5 mils thick, and then exposed to artificial weathering as described in Example 3. A comparable sample of polypropylene film containing no additive was similarly exposed. The polypropylene had a melt index (A.S.T.M. D1238–52T) of 0.08, an ash content of about 0.43% and an inherent viscosity of 2.77. The polypropylene film containing no additive became brittle after 40 hours of exposure while the polypropylene containing the substituted urea stabilizer additive did not become brittle until 200 hours of exposure. Polypropylene is similarly stabilized against weathering with 1% by weight of either 1-(p-hydroxyphenyl)-3-phenylurea, 1,3-di-(p-methoxyphenyl)urea, 1,3-di-(p-hydroxyphenyl)thiourea or 1,1'-(4-methyl-1,3-phenylene)-bis[3-(p-hydroxyphenyl)-3-methylurea].

EXAMPLE 6

The stabilizers of the invention have good compatibility in poly-α-olefins, and in particular, in polyethylene. The stabilizers of the invention, as well as several closely related compounds and well-known plastic stabilizers, were tested for compatibility in polyethylene by attempting to compound at a 1% by weight level the various materials into samples of polyethylene by rolling on hot rolls at a temperature of about 160° C. in accordance with usual practice. The polyethylene had an average molecular weight of about 27,600 and a density of 0.919. Table 5 below summarizes the results of this compatibility study.

Table 5

| Additive | Exudation from Polyethylene |
|---|---|
| 1-(p-Hydroxyphenyl)-3-phenylurea [1] | None. |
| 1-(p-Hydroxyphenyl)-1-methyl-3-phenylurea.[1] | Do. |
| 1,3-Di-(p-hydroxyphenyl)thiourea [1] | Do. |
| 1,3-Di-(p-methoxyphenyl)urea [1] | Do. |
| 1,1'-(4-methyl-1,3-phenylene)-bis[3-(p-hydroxyphenyl)-3-methylurea].[1] | Do. |
| 1,1-(Methylene-di-p-phenylene)-bis[3-(p-hydroxyphenyl)-3-methylurea]. | Partly insoluble. |
| 1,1'-(1,5-Naphthylene)-bis[3-(p-hydroxyphenyl)-3-methylurea]. | Do. |
| 1-(p-Hydroxyphenyl)-1-methyl-3-phenylthiourea. | Insoluble. |
| 1,3-Di-(p-hydroxyphenyl)urea | None. |
| Urea | Would not roll compound. |
| Thiourea | Decomposed on rolling. |
| 1,3-diethyl-1,3-diphenylurea | Slow growth of large crystals. |
| Tetraphenylurea | Much, fine crystals. |
| Thiocarbanilide | Very slight. |
| 4,4'-Diphenylthiocarbanilide | None. |
| 2,4-Dihydroxybenzophenone | Much, fine crystals. |
| 2-Hydroxy-4-methoxybenzophenone | Do. |
| 2-Hydroxy-4,4'-dimethoxybenzophenone | Do. |
| 2,2'-Dihydroxy-4,4'-dimethoxybenzophenone. | Do. |

[1] Stabilizers of the invention.

As illustrated by the above examples, the substituted urea stabilizers of the invention are both compatible with, and effective stabilizers for, normally solid poly-α-olefins. Several urea compounds closely related to the stabilizers of the invention and many conventional stabilizers suitable for other plastic compositions were found not to possess the properties desired of poly-α-olefin stabilizers.

Although the invention has been described in detail with reference to certain preferred embodiments thereof, it will be understood that variations and modifications can be effected within the spirit and scope of the invention as described hereinabove and as defined in the appended claims.

We claim:

1. A solid poly-α-olefin composition comprising a solid poly-α-olefin selected from the group consisting of polyethylene and polypropylene containing 0.1% to 10% by weight based on said poly-α-olefin of a substituted urea selected from the group consisting of 1-(p-hydroxyphenyl)-3-phenylurea, 1 - (p - hydroxyphenyl) - 1 - methyl - 3-phenylurea, 1,3-di-(p-methoxyphenyl) urea, 1,3-di-(p-hydroxyphenyl) thiourea and 1,1'-(4-methyl-1,3-phenylene)bis[3-(p-hydroxyphenyl)-3-methylurea].

2. A solid poly-α-olefin composition in a film 0.5 to 100 mils in thickness comprising a solid poly-α-olefin selected from the group consisting of polyethylene and polypropylene containing 0.5% to 5% by weight based on said poly-α-olefin of a substituted urea selected from the group consisting of 1-(p-hydroxyphenyl)-3-phenylurea, 1-(p-hydroxyphenyl)-1-methyl-3-phenylurea, 1,3-di-(p-methoxyphenyl)urea, 1,3-di-(p-hydroxyphenyl) thiourea and 1,1' - (4 - methyl - 1,3 - phenylene)-bis[3-(p-hydroxyphenyl)-3-methylurea].

3. A solid polyethylene composition comprising solid polyethylene containing 0.5% to 5% by weight based on said polyethylene of 1-(p-hydroxyphenyl)-3-phenylurea.

4. A solid polyethylene composition comprising solid polyethylene containing 0.5% to 5% by weight based on said polyethylene of 1-(p-hydroxyphenyl)-1-methyl-3-phenylurea.

5. A solid polyethylene composition comprising solid polyethylene containing 0.5% to 5% by weight based on said polyethylene of 1,3-di-(p-methoxyphenyl)urea.

6. A solid polyethylene composition comprising solid polyethylene containing 0.5% to 5% by weight based on said polyethylene of 1,3-di-(p-hydroxyphenyl)thiourea.

7. A solid polyethylene composition comprising solid polyethylene containing 0.5% to 5% by weight based on said polyethylene of 1,1'-(4-methyl-1,3-phenylene)-bis [3-(p-hydroxyphenyl)-3-methylurea].

8. A solid polypropylene composition comprising solid polypropylene containing 0.5% to 5% by weight based on said polypropylene of 1,3-di-(p-hydroxyphenyl)-1-methyl-3-phenylurea.

References Cited in the file of this patent

UNITED STATES PATENTS 2,651,623     Hill et al. _____ Sept. 8, 1953

FOREIGN PATENTS 609,177     Great Britain _____ Sept. 27, 1948